United States Patent
Zawadowskiy et al.

(10) Patent No.: US 9,660,833 B2
(45) Date of Patent: May 23, 2017

(54) APPLICATION IDENTIFICATION IN RECORDS OF NETWORK FLOWS

(71) Applicant: Cisco Technology, Inc., San Jose, CA (US)

(72) Inventors: Andrew Zawadowskiy, Hollis, NH (US); Vincent E. Parla, North Hampton, NH (US); Donovan O'Hara, Boxborough, MA (US)

(73) Assignee: Cisco Technology, Inc., San Jose, CA (US)

( * ) Notice: Subject to any disclaimer, the term of this patent is extended or adjusted under 35 U.S.C. 154(b) by 349 days.

(21) Appl. No.: 14/274,220

(22) Filed: May 9, 2014

(65) Prior Publication Data

US 2015/0326486 A1    Nov. 12, 2015

(51) Int. Cl.
*H04L 12/64*    (2006.01)
*H04L 12/805*   (2013.01)
*H04L 12/26*    (2006.01)

(52) U.S. Cl.
CPC ........ *H04L 12/6418* (2013.01); *H04L 43/026* (2013.01); *H04L 43/0876* (2013.01); *H04L 47/36* (2013.01)

(58) Field of Classification Search
CPC ..... H04L 47/36; H04L 43/0876; H04L 43/04; H04L 43/062; H04L 63/1408; H04L 63/1416; H04L 63/1425
See application file for complete search history.

(56) References Cited

U.S. PATENT DOCUMENTS

| | | | | |
|---|---|---|---|---|
| 6,243,667 B1* | 6/2001 | Kerr | ........................ | H04L 45/00 370/379 |
| 7,398,530 B1* | 7/2008 | Parla | ........................ | G06F 9/542 714/2 |
| 7,607,041 B2* | 10/2009 | Kraemer | ............... | G06F 21/552 714/15 |
| 7,716,731 B2* | 5/2010 | Short | ..................... | H04L 69/16 726/14 |
| 7,882,560 B2* | 2/2011 | Kraemer | ................. | G06F 21/55 705/51 |
| 8,255,995 B2 | 8/2012 | Kraemer et al. | | |
| 8,331,234 B1* | 12/2012 | Newton | ................ | H04L 43/026 370/231 |

(Continued)

OTHER PUBLICATIONS

Cisco, "Cisco IOS NetFlow Version 9 Flow-Record Format", http://www.cisco.com/en/US/technologies/tk648/tk362/technologies_white_paper09186a00800a3db9.html, May 2011, 14 pages.

*Primary Examiner* — Backhean Tiv
(74) *Attorney, Agent, or Firm* — Edell, Shapiro & Finnan, LLC

(57) ABSTRACT

In one embodiment, a method is provided for improving data center and endpoint network visibility and security. The method comprises detecting a communication flow of a plurality of packets over a network, and generating a flow identifier that uniquely identifies the communication flow. After determining an application associated with the communication flow, a flow record is generated. The flow record includes the flow identifier and an indication of the application associated with the communication flow. The indication of the application may be, for example, a hash of the application binary file.

21 Claims, 6 Drawing Sheets

(56) References Cited

U.S. PATENT DOCUMENTS

| | | | | |
|---|---|---|---|---|
| 8,374,102 B2* | 2/2013 | Luft | .................... | H04L 41/5067 370/253 |
| 8,413,245 B2* | 4/2013 | Kraemer | ............... | G06F 21/564 705/51 |
| 8,474,044 B2* | 6/2013 | Zawadowskiy | ....... | G06F 21/564 726/23 |
| 8,495,743 B2* | 7/2013 | Kraemer | ............... | G06F 21/554 726/22 |
| 8,533,780 B2* | 9/2013 | Parla | .................. | H04L 63/0272 713/153 |
| 8,627,449 B2* | 1/2014 | Parla | .................. | H04L 63/0272 709/227 |
| 8,689,299 B2* | 4/2014 | McBride | ................ | G06F 21/41 380/270 |
| 2004/0024921 A1* | 2/2004 | Peake, Jr. | ........... | G06F 11/3485 710/1 |
| 2004/0098619 A1* | 5/2004 | Shay | ....................... | H04L 63/02 726/13 |
| 2012/0137291 A1* | 5/2012 | Bacher | ................ | G06F 9/45558 718/1 |
| 2014/0215226 A1* | 7/2014 | Litty | ....................... | G06F 21/53 713/193 |
| 2015/0326486 A1* | 11/2015 | Zawadowskiy | ......... | H04L 47/36 709/224 |

* cited by examiner

APPLICATION IDENTIFICATION IN RECORDS OF NETWORK FLOWS

TECHNICAL FIELD

The present disclosure relates to tracking applications responsible for network communication flows.

BACKGROUND

In a computer network, a communication flow may be defined by a plurality of messages (e.g., packets) between a source and a destination. Any time two devices interact over a packet network (e.g., the Internet), a communication flow can be defined by identifying all of the packets that are addressed from the first device to the second device. Since a communication flow may be bidirectional, the flow also includes all of the packets addressed from the second device to the first device.

NetFlow records allow data centers to monitor communication flows between virtual machines (VMs), as well as communication flows between VMs and outside services. This provides network visibility to network and data center administrators. Currently, Netflow records document the size of the communication flow (e.g., number of bytes, time duration), the source and destination addresses of the machines in the communication flow (e.g., Internet Protocol (IP) addresses and port numbers), as well as the application protocol of the communication flow (e.g., Hypertext Transfer Protocol (HTTP)).

DESCRIPTION OF EXAMPLE EMBODIMENTS

Overview

In one embodiment, a method is provided for improving data center and endpoint network visibility and security. The method comprises detecting a communication flow of a plurality of packets over a network, and generating a flow identifier that uniquely identifies the communication flow. After determining an application associated with the communication flow, a flow record is generated. The flow record includes the flow identifier and an indication of the application associated with the communication flow.

Example Embodiments

Communication monitoring, such as that afforded by the NetFlow functionality in network elements, in computer networks allows for administrators to provide services to tailor the network properties provided to specific communication flows. For example, communication flows that require a certain Quality of Service (QoS) can be provided with an appropriate network path to satisfy the QoS requirements. In another example, a communication flow that is determined to be related to known malware can be stopped, limiting the damage from the malware.

Encrypted communication flows provide a challenge in determining appropriate network requirements, since the encryption masks the transport protocol as well as the content of the flow. Additionally, as various types of applications begin to make use of the same transport protocols, insight into the protocol of a communication flow becomes insufficient to determine appropriate network requirements. Network visibility and security may be improved by providing a direct link between the application and the traffic seen on the network. Knowing that a binary file responsible for network traffic is a known good binary or known bad binary can affect the security decisions made by network components and/or administrators. Additionally, unknown binaries may be subject to further analysis to aid in detecting potential zero-day malware.

Figure 1:
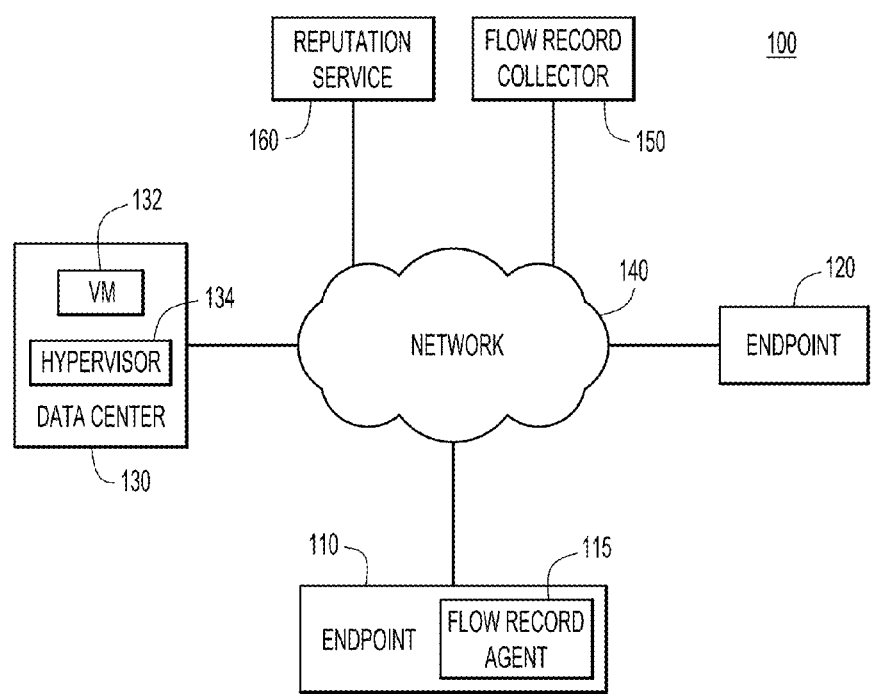
FIG. 1 is a block diagram of a system of devices configured to monitor communication flows according to an example embodiment.

Referring to FIG. 1, a system 100 is shown that enables an endpoint 110 to generate flow records of its communication flows according to the techniques presented herein. Endpoint 110 includes flow record agent 115, which is used to generate and propagate flow records of communication flows with other endpoints, such as endpoint 120. Another example of a type of endpoint is shown at data center 130 with virtual machine (VM) 132 and hypervisor 134. All of these endpoints communicate over network 140. Flow record collector 150 also communicates over network 140 and is configured to collect the flow record from endpoint 110, endpoint 120, and/or data center 130. Cloud application reputation and information service 160 classifies applications and provides feedback to the flow record collector 150. In one example, the cloud reputation service provides trustworthiness data on applications to classify the applications as known-good, known-bad, or unknown applications.

Only one data center and two endpoints are shown in FIG. 1, but any number of endpoints and/or data centers may be included in system 100. Endpoint devices 110 and 120 may take a variety of forms, including a desktop computer, laptop computer, server, mobile/cellular phone, tablet computer, Internet telephone, etc. Only endpoint 110 is shown with flow record agent 115, but any or all of the other endpoints or the VM(s) of endpoint 130 may include a similar flow record agent. Network 140 may be any type of network (e.g., any combination of Internet, intranet, local area network (LAN), wide area network (WAN), wired network, wireless network, etc.) that connects computing devices, e.g., endpoint devices 110 and 120, data center 130, and flow record collector 140.

Figure 2:
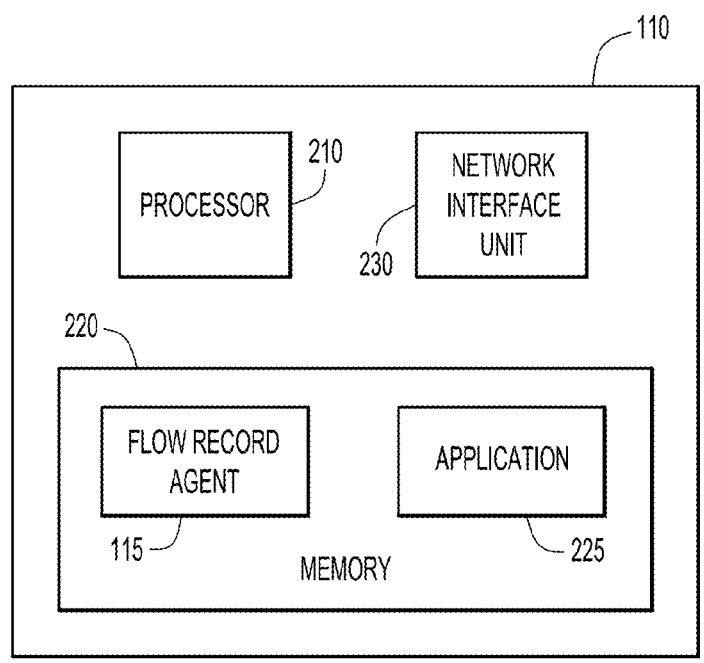
FIG. 2 is a block diagram of an endpoint device configured with a flow record agent, according to an example embodiment.

Referring now to FIG. 2, a simplified block diagram of an endpoint 110 configured to provide a flow records is shown. Endpoint 110 includes, among other possible components, a processor 210 to process instructions relevant to monitoring a communication flow, memory 220 to store a variety of data and software instructions (e.g., flow record agent 115, application 225, etc.). The endpoint 110 also includes a network interface unit (e.g., network interface card) 230 to communicate with other endpoints and flow record collector 150. Application 225 may initiate or accept communication flows with other endpoints through network interface unit 230. In one example, application 225 may be an executable binary file. Alternatively, application 225 may comprise a dynamic library (e.g., *.dll, *.dylib, *.so, etc.), interpreted code (e.g., Java .jar files, etc) or scripted content (e.g. Javascript, HTML5, etc). Flow record agent 115 has a view of all of the network activity on the endpoint 110, as well as application and user information associated with all of the network data. The agent 115 may generate flow records (e.g., NetFlow records) for all network communication to and from endpoint 110. The flow records include application identification information, and may further include user identification information. In one example, the application identification comprises a hash of the application binary, i.e., the executable file. In another example, the application identification comprises a hash of a dynamic library or interpreted code file, and the flow record may further comprise a "parent application" field, such as the Java Virtual Machine (JVM) process that is hosting the interpreted Java file.

Memory 220 may comprise read only memory (ROM), random access memory (RAM), magnetic disk storage media devices, optical storage media devices, flash memory devices, electrical, optical, or other physical/tangible (e.g., non-transitory) memory storage devices. The processor 210 is, for example, a microprocessor or microcontroller that executes instructions for implementing the processes described herein. Thus, in general, the memory 220 may comprise one or more tangible (non-transitory) computer readable storage media (e.g., a memory device) encoded with software comprising computer executable instructions and when the software is executed (by the processor 210) it is operable to perform the operations described herein.

Figure 3:
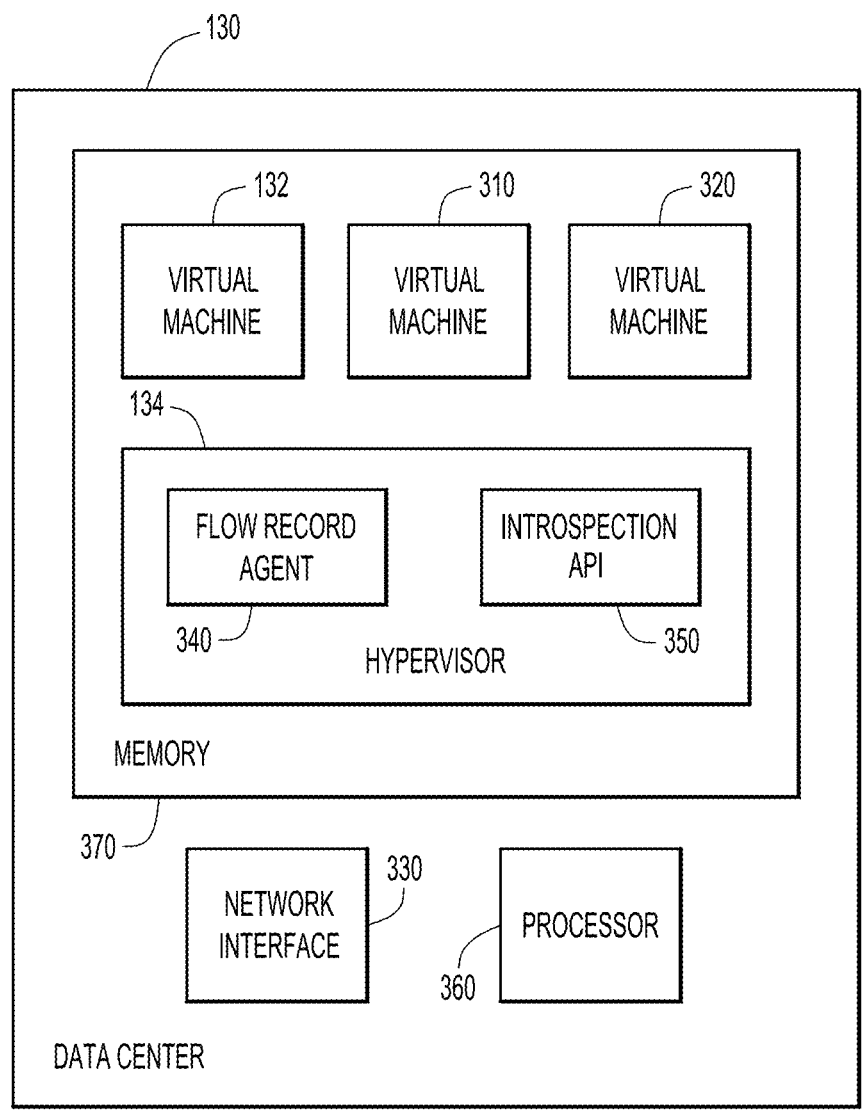
FIG. 3 is a block diagram of a data center with a hypervisor configured with a flow record agent according to an example embodiment.

Referring now to FIG. 3, a simplified block diagram of a data center 130 configured to provide flow records for a plurality of virtual machines is shown. Data center 130 includes a plurality of virtual machines 132, 310 and 320, and a network interface unit 330 that allows the virtual machines to communicate over network 140. Hypervisor 134 includes a flow record agent 340 that uses an introspection application programming interface (API) 350 to monitor the network activities of the virtual machines 132, 310, and 320. The hypervisor 134 uses introspection API 350 to see network and file activity. The introspection API 350 may also have the ability to interrogate or inspect processes running in a user's VM from an agent process (e.g., agent 340) running in a protected management VM or in the hypervisor 134.

Data center 130 includes a processor 360 to process instructions relevant to supporting virtual machines 132, 310, and 320, as well as hypervisor 134. Data center 130 also includes memory 370 to store a variety of data and software instructions (e.g., flow record agent 340, communication flows, etc.). Memory 370 may comprise ROM, RAM, magnetic disk storage media devices, optical storage media devices, flash memory devices, electrical, optical, or other physical/tangible (e.g., non-transitory) memory storage devices. The processor 360 is, for example, one or more microprocessors or microcontrollers that execute instructions for implementing the processes described herein with respect to a plurality of virtual machines. Thus, in general, the memory 360 may comprise one or more tangible (non-transitory) computer readable storage media (e.g., a memory device) encoded with software comprising computer executable instructions and when the software is executed (by the processor 360) it is operable to perform the operations described herein.

Figure 4:
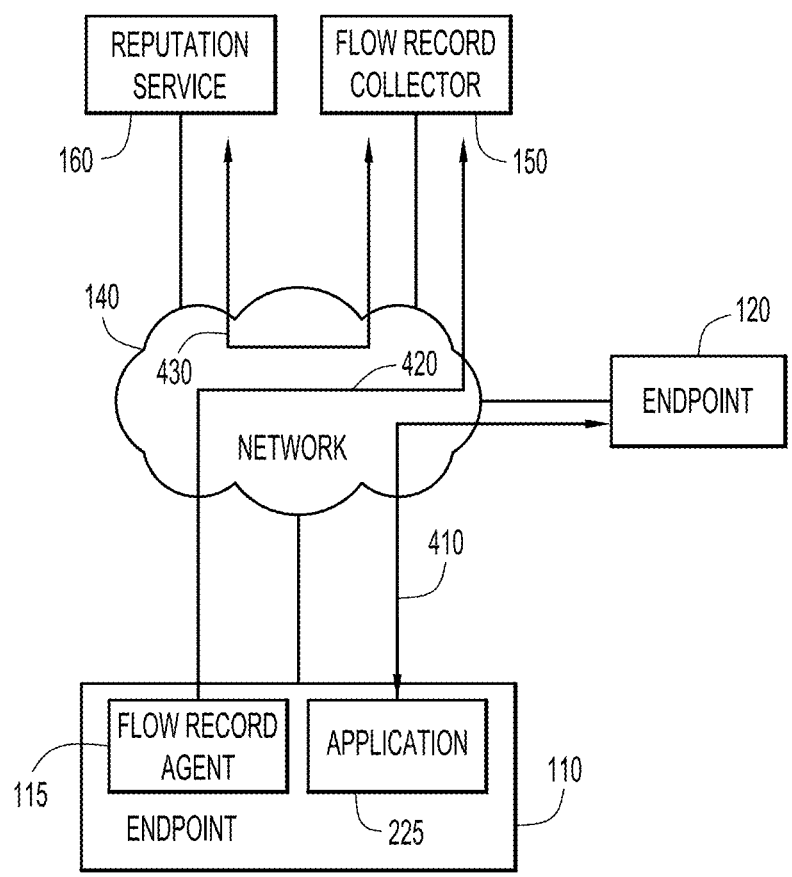
FIG. 4 is a block diagram of monitoring a communication flow between two endpoint devices according to an example embodiment.

Referring now to FIG. 4, a simplified block diagram shows endpoint 110 recording a communication flow according to the techniques presented herein. In this example, endpoint 110 and endpoint 120 establish a communication flow 410, e.g., a flow of packets in both directions for a session. Flow record agent 115 transmits a flow record 420 to flow record collector 150. The flow record 420 identifies the communication flow 410 as well as the application 225 that initiated the communication flow 410. Alternatively, in an example in which communication flow 410 was initiated by endpoint 120, the flow record identifies the application 225 that accepted the communication flow in endpoint 110.

Flow record collector 150 may collect flow records from a plurality of endpoints and/or data centers. As the flow record collector 150 collects the flow records, it may transmit a query 430 for application information from a cloud application reputation and information service 160. The cloud application reputation service 160 can build a reputation database of different applications. The application identification may be extracted from the flow records and used as a key in the query. The cloud application reputation and information service 160, given the key provided, may return feedback about the application, e.g., to the flow record collector 150. The flow record collector 150 this receives application reputation and information data from the cloud application reputation and information service 160, allowing the flow record collector 150 to display the applications and information about the applications used on the network. The flow record collector 150 may also provide this data to a security and event management system (SIEM). The same information may be used for detecting botnets and/or other malware running on the endpoints.

In one example, the communication flow 410 is encrypted to maintain privacy from any intermediate node on the network 140. Since the flow record agent 115 resides on the endpoint 110, it is able to generate the flow record before the communication flow 410 leaves the endpoint 110 in an encrypted form. The flow record 420 may be transmitted to the flow record collector 150 either encrypted or unencrypted, regardless of whether the communication flow 410 is encrypted or unencrypted.

In another example, the flow record 420 is compatible with the NetFlow standard, and includes any data typically found in a NetFlow record. In this example, the flow record collector 150 is a Netflow collector probe. One example of a flow record 420 compatible with Netflow version 9 is presented below:
Frame 25: 291 bytes on wire (2328 bits), 291 bytes captured (2328 bits)
  Arrival Time: Jan 01, 2014 11:30:46.444933000 EDT
  Frame Length: 291 bytes (2328 bits)
  [Protocols in frame: eth:ip:udp:cflow]
Internet Protocol Version 4, Src: 10.0.0.3 (10.0.0.3), Dst: 10.0.0.113 (10.0.0.113)
  Total Length: 277
  Source: 10.0.0.3 (10.0.0.3)
  Destination: 10.0.0.113 (10.0.0.113)
User Datagram Protocol, Src Port: 57166 (57166), Dst Port: iop (2055)
  Source port: 57166 (57166)
  Destination port: iop (2055)
  Length: 257
Cisco NetFlow/IPFIX
  Version: 9
  Count: 2
  SysUptime: 2568536138
  Timestamp: Jan 01, 2014 11:42:07.000000000 EDT
    CurrentSecs: 1395243727
  FlowSequence: 0
  SourceId: 127

FlowSet 1
  FlowSet Id: Data Template (V9) (0)
  FlowSet Length: 76
  Template (Id=333, Count=17)
    Template Id: 333
    Field Count: 17
    Field (1/17): BYTES
      Type: BYTES (1)
      Length: 8
    Field (2/17): OUT_BYTES
      Type: OUT_BYTES (23)
      Length: 8
    Field (3/17): PKTS
      Type: PKTS (2)
      Length: 4
    Field (4/17): OUT_PKTS
      Type: OUT_PKTS (24)
      Length: 4
    Field (5/17): IP_SRC_ADDR
      Type: IP_SRC_ADDR (8)
      Length: 4
    Field (6/17): IP_DST_ADDR
      Type: IP_DST_ADDR (12)
      Length: 4
    Field (7/17): L4_SRC_PORT
      Type: L4_SRC_PORT (7)
      Length: 2
    Field (8/17): L4_DST_PORT
      Type: L4_DST_PORT (11)
      Length: 2
    Field (9/17): FLOWS
      Type: FLOWS (3)
      Length: 4
    Field (10/17): PROTOCOL
      Type: PROTOCOL (4)
      Length: 1
    Field (11/17): LAST_SWITCHED
      Type: LAST_SWITCHED (21)
      Length: 4
    Field (12/17): FIRST_SWITCHED
      Type: FIRST_SWITCHED (22)
      Length: 4
    Field (13/17): FLOW_ACTIVE_TIMEOUT
      Type: FLOW_ACTIVE_TIMEOUT (36)
      Length: 2
    Field (14/17): FLOW_INACTIVE_TIMEOUT
      Type: FLOW_INACTIVE_TIMEOUT (37)
      Length: 2
    Field (15/17): USER_ID
      Type: USER_ID (127)
      Length: 32
    Field (16/17): APPLICATION_NAME
      Type: APPLICATION_NAME (96)
      Length: 32
    Field (17/17): APPLICATION_HASH
      Type: APPLICATION_HASH (128)
      Length: 32
FlowSet 2
  FlowSet Id: (Data) (333)
  FlowSet Length: 153
  Flow 1
    Octets: 480
    Post Octets: 1370
    Packets: 1
    Post Packets: 2
    SrcAddr: 10.0.0.3 (10.0.0.3)
    DstAddr: 72.163.4.161 (72.163.4.161)
    SrcPort: 41461
    DstPort: 443
    Flows: 1
    Protocol: 6
    [Duration: 0.000000000 seconds]
      StartTime: 1395243.727000000 seconds
      EndTime: 1395243.727000000 seconds
    Flow active timeout: 0
    Flow inactive timeout: 0
    UserID: tom
    ApplicationName: chrome.exe
    ApplicationHash:  Value  (hex  bytes):
      65C530149D7DEDF977E806521839B0D1-
      8FB62A5625EE796E3EDF00C50D7A84F7

In another example, the flow record may include a domain qualified user ID, as shown below:

Frame 34: 291 bytes on wire (2328 bits), 291 bytes captured (2328 bits)
  Arrival Time: Jan 01, 2014 12:03:55.780412000 EDT
  Frame Length: 291 bytes (2328 bits)
  [Protocols in frame: eth:ip:udp:cflow]
Internet Protocol Version 4, Src: 10.0.0.6 (10.0.0.6), Dst: 10.0.0.113 (10.0.0.113)
  Total Length: 277
  Source: 10.0.0.6 (10.0.0.6)
  Destination: 10.0.0.113 (10.0.0.113)
User Datagram Protocol, Src Port: 64614 (64614), Dst Port: iop (2055)
  Source port: 64614 (64614)
  Destination port: iop (2055)
  Length: 257
Cisco NetFlow/IPFIX
  Version: 9
  Count: 2
  SysUptime: 1012816602
  Timestamp: Jan 01, 2014 12:11:04.000000000 EDT
    CurrentSecs: 1395245464
  FlowSequence: 0
  SourceId: 127
  FlowSet 1
    FlowSet Id: Data Template (V9) (0)
    FlowSet Length: 76
    Template (Id=333, Count=17)
      Template Id: 333
      Field Count: 17
      Field (1/17): BYTES
        Type: BYTES (1)
        Length: 8
      Field (2/17): OUT_BYTES
        Type: OUT_BYTES (23)
        Length: 8
      Field (3/17): PKTS
        Type: PKTS (2)
        Length: 4
      Field (4/17): OUT_PKTS
        Type: OUT_PKTS (24)
        Length: 4
      Field (5/17): IP_SRC_ADDR
        Type: IP_SRC_ADDR (8)
        Length: 4
      Field (6/17): IP_DST_ADDR
        Type: IP_DST_ADDR (12)
        Length: 4
      Field (7/17): L4_SRC_PORT
        Type: L4_SRC_PORT (7)
        Length: 2

Field (8/17): L4_DST_PORT
　Type: L4_DST_PORT (11)
　Length: 2
Field (9/17): FLOWS
　Type: FLOWS (3)
　Length: 4
Field (10/17): PROTOCOL
　Type: PROTOCOL (4)
　Length: 1
Field (11/17): LAST_SWITCHED
　Type: LAST_SWITCHED (21)
　Length: 4
Field (12/17): FIRST_SWITCHED
　Type: FIRST_SWITCHED (22)
　Length: 4
Field (13/17): FLOW_ACTIVE_TIMEOUT
　Type: FLOW_ACTIVE_TIMEOUT (36)
　Length: 2
Field (14/17): FLOW_INACTIVE_TIMEOUT
　Type: FLOW_INACTIVE_TIMEOUT (37)
　Length: 2
Field (15/17): USER_ID
　Type: USER_ID
　Length: 32
Field (16/17): APPLICATION_NAME
　Type: APPLICATION_NAME (96)
　Length: 32
Field (17/17): APPLICATION_HASH
　Type: APPLICATION_HASH (128)
　Length: 32
FlowSet 2
　FlowSet Id: (Data) (333)
　FlowSet Length: 153
　Flow 1
　　Octets: 15048
　　Post Octets: 1195
　　Packets: 27
　　Post Packets: 2
　　SrcAddr: 10.0.0.6 (10.0.0.6)
　　DstAddr: 10.0.2.49 (10.0.2.49)
　　SrcPort: 52726
　　DstPort: 995
　　Flows: 1
　　Protocol: 6
　　[Duration: 0.002000000 seconds]
　　　StartTime: 1395245.462000000 seconds
　　　EndTime: 1395245.464000000 seconds
　　Flow active timeout: 0
　　Flow inactive timeout: 0
　　UserID: ACME\harry
　　ApplicationName: thunderbird.exe
　　ApplicationHash: Value (hex bytes):
　　　45DA0C5E5E85FE767EDBD3CE7C920F-
　　　6EA9B2F1CF3E40BE72C07EDC20A030D7E2

Figure 5:
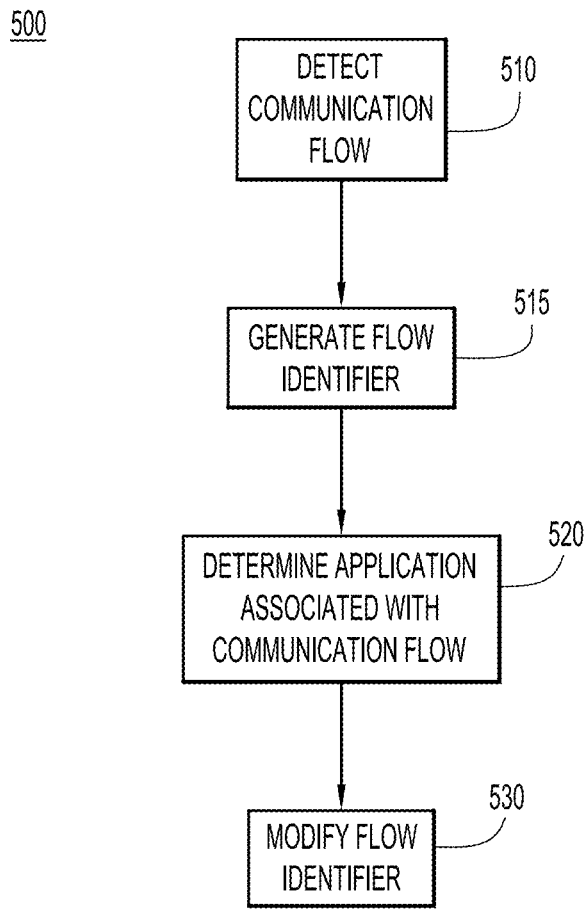
FIG. 5 is a flowchart depicting operations of a flow record agent in monitoring the communication flows of a device according to an example embodiment.

Referring now to FIG. 5, an example process 500 for monitoring communication flows is shown. In step 510, a flow record agent detects a communication flow and generates a flow identifier at step 515. The flow identifier may include a source IP address and port number and a destination IP address and port. The agent determines an application associated with the communication flow at step 520. In step 530, the agent modifies a flow identifier to indicate the application associated with the communication flow. In one example, the agent resides on an endpoint and the agent detects the communication flow when an application on the endpoint initiates the communication flow. Alternatively, the agent may detect the communication flow when an application on the endpoint accepts a communication flow initiated by another endpoint. In another example, the flow record agent is run by a hypervisor that has visibility into a plurality of virtual machines.

In another example, the agent determines the application associated with the communication flow, as well as the user that is running that application. The agent may generate a flow record that identifies the communication flow, the application associated with the communication flow, and the user associated with the application. The flow record may also include a hash of the application binary to identify the application. Since the hash of the application binary would differ for each version of the application, or if the application has been modified (e.g., by malware), the hash is specific to the actual application responsible for that particular communication flow.

Including the application hash in the flow record enables a flow record collector to have visibility into which application is responsible for a communication flow, rather than simply seeing the application protocol that is used in the communication flow. For example, if a malware application uses Secure Shell (SSH) protocol to communicate with a Command and Control (C&C) server, the techniques presented herein provide the hash of the actual malware file or malware application. This enables the flow record collector to amass a listing of all of the applications that are responsible for network traffic and classify them as known-good applications, known-bad applications, or unknown applications. Security analysts may be most interested in known-bad and unknown applications, and may be able to report on the activities of malware more effectively. Analysis of known-good applications may be used, for example, to determine how much data is transferred from a known-good application to a cloud location, e.g., exfiltration analysis.

The flow record agent includes at least the following four abilities: 1) to see network traffic, 2) given a particular network flow (e.g., defined by a 5-tuple), to deterministically establish which process, as seen directly on the endpoint, has created the connection to this flow, 3) to correlate the user who is running the application, and 4) to access the binary files for corresponding processes, in order to build a hash of the binary image and any other relevant data from the endpoint.

Figure 6:
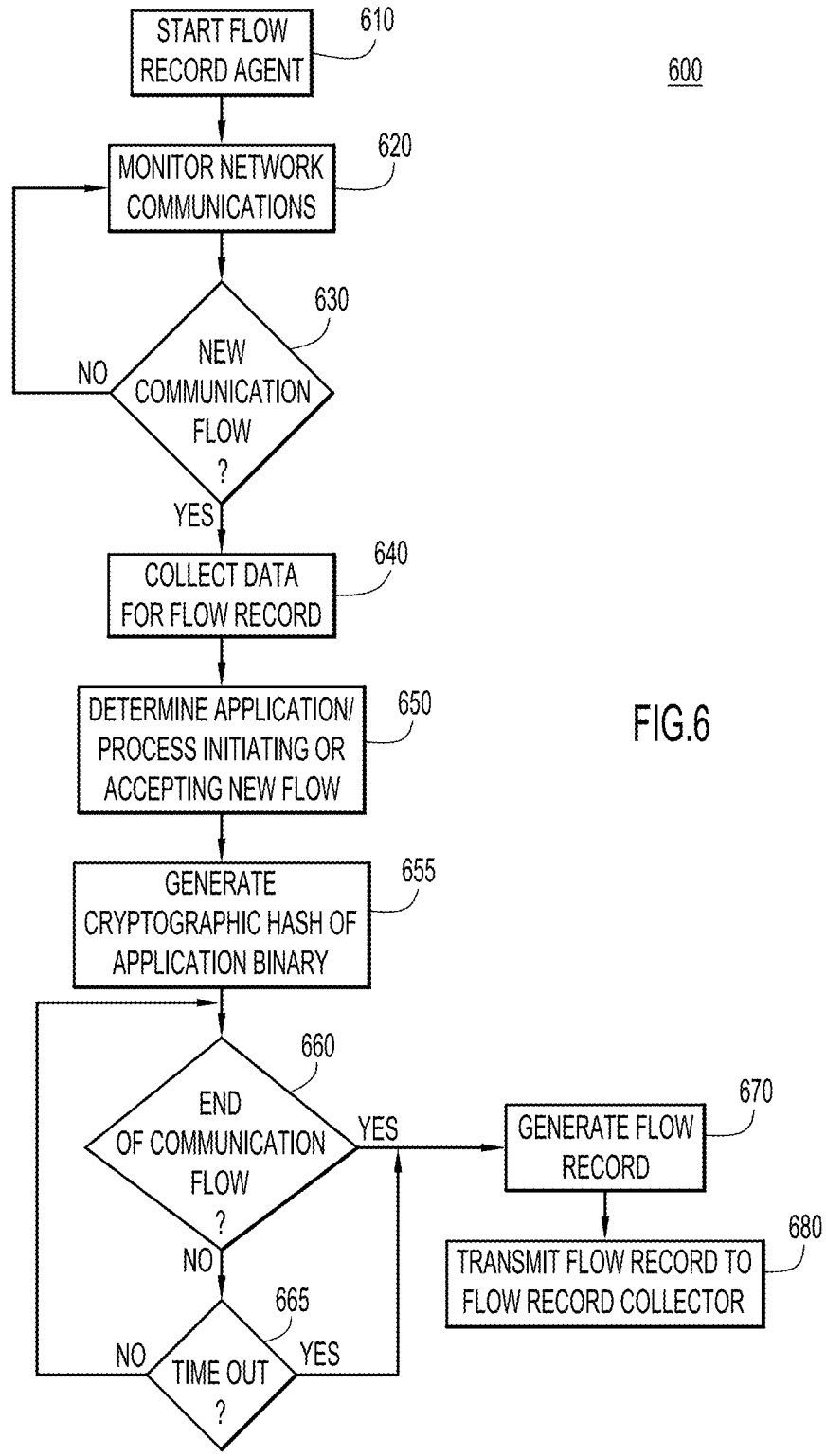
FIG. 6 is a flowchart depicting operations of a flow record agent in monitoring communication flows from a device according to an example embodiment.

Referring now to FIG. 6, an example process 600 for monitoring communication in a data center is shown. In step 610, the flow record agent resident in the hypervisor of a data center is started. When started, the agent uses an API to see both file activity and network activity. The API may also provide for interrogating running processes communicating on the network. Once the user VMs get started and begin to communicate over the network, the agent monitors network communications at step 620. Responsive to a determination in step 630 that there is a new communication flow, the agent collects data for a flow record at step 640. The data for the flow record identifies the flow and may comprise a source IP address and port, and a destination IP address and port.

Using an introspection API provided to the hypervisor, the agent determines the application responsible for the new communication flow in step 650. The agent generates a cryptographic hash of the application binary at step 655 to identify the exact application that is responsible for the communication flow. When the communication flow terminates, as determined at step 660, or after a predetermined timeout, as determined at step 665, the agent generates a flow record at step 670. The flow record includes the data identifying the communication flow (e.g., source and destinations addresses), the application identifier (e.g., the hash of the application binary), and may further include information relevant to the communication flow and/or application (e.g., user, time information, number of packets, etc.).

The agent may transmit the flow record to a flow record collector in step 680. The flow record may be transmitted as they are generated by the agent. Alternatively, the agent may store the flow records until a flow record collector requests the flow records from the agent.

In summary, the techniques presented herein provide for a way to securely and authoritatively provide application identification within flow records, such as NetFlow records. This provides improved data center and endpoint network visibility and security.

In one embodiment, the techniques presented herein provide for a computer-implemented method of monitoring communications. The method includes detecting a communication flow of a plurality of packets over a network, and generating a flow identifier that uniquely identifies the communication flow. After determining an application associated with the communication flow, a flow record is generated. The flow record includes the flow identifier and an indication of the application associated with the communication flow.

In another form, an apparatus is provided comprising a network interface unit and a processor. The network interface unit is configured to enable communications over a network. The processor is configured to detect a communication flow of a plurality of packets over the network and generate a flow identifier that uniquely identifies the communication flow. The processor is further configured to determine an application associated with the communication flow and generate a flow record. The flow record comprises the flow identifier and an indication of the application associated with the communication flow.

In yet another form, one or more computer readable storage media are provided encoded with software comprising computer executable instructions. When the software is executed, a processor is directed to detect a communication flow of a plurality of packets over a network and generate a flow identifier that uniquely identifies the communication flow. The instructions cause the processor to determine an application associated with the communication flow and generate a flow record. The flow record comprises the flow identifier and an indication of the application associated with the communication flow.

The above description is intended by way of example only. Various modifications and structural changes may be made therein without departing from the scope of the concepts described herein and within the scope and range of equivalents of the claims.

What is claimed is:

1. A method comprising:
   at a hypervisor in a data center, detecting a communication flow over a network, the communication flow comprising a plurality of packets between at least one endpoint in the data center, wherein the communication flow is encrypted;
   generating a flow identifier that uniquely identifies the communication flow;
   determining an application associated with the communication flow by using an introspection application programming interface (API) provided to the hypervisor to identify the application; and
   generating a flow record comprising the flow identifier and an indication of the application associated with the communication flow.

2. The method of claim 1, further comprising generating the indication of the application by computing a hash of a binary file associated with the application.

3. The method of claim 2, wherein the binary file comprises one of an executable file, a dynamic library file, and a file of interpreted code.

4. The method of claim 1, wherein the indication of the application includes a user identifier.

5. The method of claim 4, wherein the user identifier is a domain qualified user identifier.

6. The method of claim 1, wherein the introspection API enables visibility into network communication and file activity.

7. The method of claim 1, wherein the flow record comprises a NetFlow record.

8. The method of claim 7, further comprising:
   transmitting the flow record to a NetFlow collector probe.

9. The method of claim 1, wherein the hypervisor identifies the application through an agent process that interrogates processes on the at least one endpoint of the data center.

10. An apparatus comprising:
    a network interface unit configured to enable communications over a network; and
    a processor configured to:
       detect, via the network interface unit, a communication flow over the network, the communication flow comprising a plurality of packets between at least one endpoint in a data center, wherein the communication flow is encrypted;
       generate a flow identifier that uniquely identifies the communication flow;
       determine an application associated with the communication flow by using an introspection application programming interface (API) provided to the apparatus to identify the application; and
       generate a flow record comprising the flow identifier and an indication of the application associated with the communication flow.

11. The apparatus of claim 10, wherein the processor is further configured to generate the indication of the application by computing a hash of a binary file associated with the application.

12. The apparatus of claim 11, wherein the binary file comprises one of an executable file, a dynamic library file, and a file of interpreted code.

13. The apparatus of claim 10, wherein the indication of the application includes a user identifier.

14. The apparatus of claim 10, wherein the introspection API enables visibility into network communication and file activity.

15. The apparatus of claim 10, wherein the flow record comprises a NetFlow record.

16. The apparatus of claim 15, wherein the processor is further configured to cause the flow record to be transmitted via the network interface unit to a NetFlow collector probe.

17. One or more non-transitory computer readable storage media encoded with software comprising computer executable instructions and when the software is executed operable to:
   detect a communication flow over a network, the communication flow comprising a plurality of packets between at least one endpoint in a data center, wherein the communication flow is encrypted;
   generate a flow identifier that uniquely identifies the communication flow;

determine an application associated with the communication flow by using an introspection application programming interface (API) to identify the application; and generate a flow record comprising the flow identifier and an indication of the application associated with the communication flow.

18. The computer readable storage media of claim 17, wherein the indication of the application comprises a hash of a binary file associated with the application.

19. The computer readable storage media of claim 18, wherein the binary file comprises one of an executable file, a dynamic library file, and a file of interpreted code.

20. The computer readable storage media of claim 17, wherein the indication of the application includes a user identifier.

21. The computer readable storage media of claim 17, wherein the instructions to determine the application associated with the communication flow comprise instructions to use the introspection API to determine the application that initiated or accepted the communication flow through an agent process that interrogates processes on the at least one endpoint of the data center.

\* \* \* \* \*